United States Patent
Ross et al.

(10) Patent No.: US 10,392,025 B2
(45) Date of Patent: *Aug. 27, 2019

(54) AUTONOMOUS VEHICLE PERFORMANCE OPTIMIZATION SYSTEM

(71) Applicant: Uber Technologies, Inc., San Francisco, CA (US)

(72) Inventors: William Payne Ross, Pittsburgh, PA (US); Brett Browning, Pittsburgh, PA (US)

(73) Assignee: Uber Technologies Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,872

(22) Filed: Dec. 29, 2017

(65) Prior Publication Data

US 2018/0141564 A1 May 24, 2018

Related U.S. Application Data

(63) Continuation of application No. 15/202,412, filed on Jul. 5, 2016, now Pat. No. 9,884,630.

(51) Int. Cl.

| | |
|---|---|
| *B60W 50/00* | (2006.01) |
| *B60W 10/18* | (2012.01) |
| *B60W 10/20* | (2006.01) |
| *B60W 40/08* | (2012.01) |
| *B60W 40/09* | (2012.01) |
| *G07C 5/08* | (2006.01) |

(52) U.S. Cl.
CPC ........ *B60W 50/0098* (2013.01); *B60W 10/18* (2013.01); *B60W 10/20* (2013.01); *B60W 40/08* (2013.01); *B60W 40/09* (2013.01); *G07C 5/0808* (2013.01); *G07C 5/0841* (2013.01); *B60W 2510/18* (2013.01); *B60W 2510/20* (2013.01); *B60W 2520/105* (2013.01)

(58) Field of Classification Search
CPC .. B60W 50/0098; B60W 10/18; B60W 10/20; B60W 40/08; B60W 40/09; B60W 2510/18; B60W 2510/20; B60W 2520/105
USPC .......................................................... 701/23
See application file for complete search history.

(56) References Cited

U.S. PATENT DOCUMENTS

| | | | |
|---|---|---|---|
| 9,189,897 B1 | 11/2015 | Stenneth | |
| 9,645,577 B1 | 5/2017 | Frazzoli | |
| 2014/0195093 A1 | 7/2014 | Litkouhi | |
| 2014/0195213 A1 | 7/2014 | Kozloski | |
| 2015/0149017 A1* | 5/2015 | Attard | B60W 30/182 |
| | | | 701/23 |

(Continued)

*Primary Examiner* — Marthe Y Marc-Coleman

(74) *Attorney, Agent, or Firm* — Dority & Manning, P.A.

(57) ABSTRACT

An autonomous vehicle (AV) performance optimization system can determine a set of performance metrics for determining AV performance. The system can receive AV performance data from AVs operating or configured for operation throughout a given region. Based on the AV performance data, the system can determine a set of deficient performance metrics in which the AV does not meet one or more performance thresholds of a set of performance metrics. The system may then generate a configuration package, executable by the AV, comprising a set of control system parameter adjustments for meeting or exceeding the one or more performance thresholds corresponding to the deficient performance metrics.

20 Claims, 7 Drawing Sheets

(56) References Cited

U.S. PATENT DOCUMENTS

2016/0026182 A1 1/2016 Boroditsky
2016/0334797 A1 11/2016 Ross
2016/0362118 A1 12/2016 Mollicone
2017/0166222 A1 6/2017 James

* cited by examiner

AUTONOMOUS VEHICLE PERFORMANCE OPTIMIZATION SYSTEM

CROSS REFERENCE TO RELATED APPLICATION

This application is a Continuation of U.S. patent application Ser. No. 15/202,412, entitled AUTONOMOUS VEHICLE PERFORMANCE OPTIMIZATION SYSTEM, and filed on Jul. 5, 2016; which is hereby incorporated by reference in its entirety.

BACKGROUND

Autonomous driving technology requires continuous sensor data processing of a situational environment of the self-driving vehicle (SDV). One limiting factor in the rollout of SDVs on public roads and highway is uncertainty with respect to the overall safety of such vehicles in normal driving situations as well as any contingency scenario. Traditional safety concepts may be necessary but insufficient for the SDV domain. For instance, SDV systems are extremely complex, having a very large and intricate code base that may be impractical to rigorously validate.

Additionally, the range of possible situations, interactions, and scenarios is virtually infinite, so safety guarantees for every conceivable scenario may not be possible. Thus, a rigorous design-based safety concept, which may often be preferred for typical software projects, may be impractical for extremely complex systems running in arbitrary, random, uncontrolled, and changing environments. Yet, in order to provide the necessary safeguards for SDV operation on public roads and highways, SDV manufacturers and operators must have a means for measuring and understanding just how safe an SDV is in its operation.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
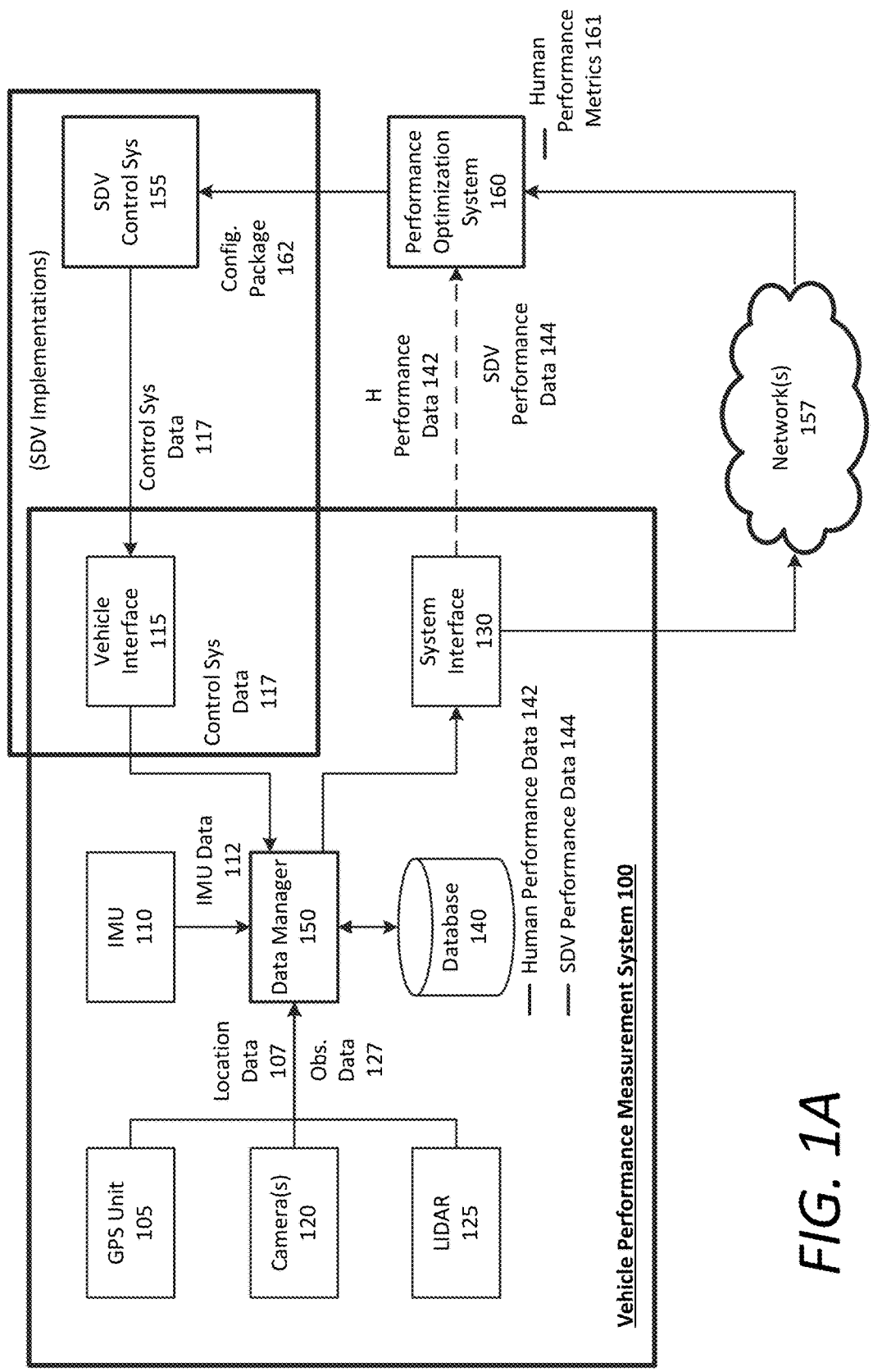
FIG. 1A is a block diagram illustrating an example vehicle performance measurement system, as described herein.

An autonomous vehicle (AV) or self-driving vehicle (SDV) performance measurement system is disclosed herein to assess the overall safety and/or performance of the SDV. According to some examples, the performance measurement system can includes a plurality of sensors, such as one or more LIDARs, cameras, inertial measurement units (IMUs), and/or global positioning system (GPS) receivers, and processing resources and memory resources for processing and storing performance data of a vehicle. Furthermore, an AV performance optimization system (e.g., either a backend remote system from the SDV or an on-board system) is provided herein that can utilize the performance data and a set of quantitative metrics to determine an overall safety and performance of the SDV. In variations, the performance measurement system can further include a housing in which various components can be housed, and can be mounted onto human-driven as well as autonomously driven vehicles. For example, the performance measurement system can be included as a single, bolt on pod mountable to the roof, or to the roof racks of a vehicle, or elsewhere on the body of the vehicle. In variations, the performance measurement system can be integrated with the SDV control system, utilizing existing sensors of the SDV to gather and store performance data.

In some examples, the performance measurement system can further include a wireless communication interface to transmit and/or receive data. In such examples, the performance measurement system can be communicatively linked to a performance optimization system, which can analyze the performance data in light of a set of quantitative metrics used to gauge the safety and performance of the vehicle. In an initial phase, the performance measurement system can be utilized with human driven vehicles to establish a set of safety, performance, and/or comfort thresholds—based on the set of quantitative metrics—that an SDV must meet in order to be adequate for public road operation. In certain implementations, the performance measurement system can be connected (e.g., via a data bus) to the SDV control system to correlate the gathered performance data with SDV actions.

Example comparison metrics can include braking, acceleration, steering, traffic law compliance, lane changing, turning, proximity, and/or following metrics. For example, the performance optimization system can analyze the performance data based on traffic law compliance metrics such as, speeding, driving too slow, slowing or stopping abruptly, stopping past a traffic line, crossing onto a shoulder, crossing a center line, running a red traffic light, lane positioning, unsafe or double lane changes, failure to yield properly, illegal passing, illegal turns or U-turns, driving without headlights, failure to signal, and the like. Examples provided herein recognize that traffic law compliance may not be black and white in many human driving scenarios, and that black and white traffic law compliance may indeed cause undesirable road and traffic situations, such as traffic backup, excessive hesitation, and even collisions. Thus, a significant hurdle must be surmounted in the rollout of SDVs, where SDVs and human drivers must be able to interact in normal as well as exigent driving conditions to build an exemplary level of trust. Traffic law compliance is paramount in building such trust, and thus analyzing SDV behaviors in light of human-based compliance metrics can prove invaluable in adjusting SDV operative and performance parameters to replicate or otherwise attempt to reproduce ideal human driving behavior.

In addition to traffic law compliance, the performance optimization system can analyze the performance data based on comfort metrics, such as the g-forces experienced when the SDV is accelerating, braking, and steering. Such comfort parameters may also be compared to a set of ideal and tolerable g-force ranges determined from established human-based metrics in the initial phase (e.g., for lateral, forward, and rearward g-force ranges). Thus, in analyzing SDV performance in light of both human-based traffic law compliance as well as ride comfort, the performance optimization system can ultimately converge on a set of SDV driving parameters that replicates what can be considered tantamount to an ideal human standard.

According to examples described herein, after the initial phase, the performance optimization system can receive performance data from SDVs operating throughout a given region, and analyze the performance data in light of the standardized metrics established in the initial phase. For example, the performance optimization system can analyze the performance data based on steering metrics established for human drivers, such as wheel jerks or unsmooth steering and steering response latency, or proximity metrics, such as tailgating or being too close to vehicles, pedestrians, bicyclists, or other objects and obstacles. Accordingly, for each of the established metrics, the performance optimization system can utilize the performance data from the performance measurement system to generate a set of improvement configurations for the SDV targeting one or more specified metrics to improve the performance, safety, and comfort of the SDV with respect to those particular metrics (e.g., individual traffic law compliance, braking latency, braking intensity, acceleration rate, steering latency, and the like).

Still further, in analyzing the performance data, the performance optimization system can ascribe or attach weightings to certain metrics that may be more predictive of overall safety and/or comfort than other metrics. Utilizing such weightings, the performance optimization system can generate an overall safety and performance score—or a set of scores—for an SDV based on received performance data. Such scores can indicate whether the SDV's performance is adequate for public road operation, or whether a number of adjustments to the SDV's operation are required to resolve any potential weaknesses. It is contemplated that such weightings for quantitative metrics may be location and/or time specific. For example, performance data received when the SDV is operating in, for instance, snowy conditions or nighttime conditions can be analyzed based on weightings specific for those conditions in order to optimize the safety and performance analysis. Thereafter, the performance optimization system can generate a configuration package for the SDV to configure one or more control system parameters to improve safety and/or performance of the SDV for one or more specified metrics. As described herein, it is further contemplated that the performance optimization system can be provided as a backend system dedicated for improving safety and performance of SDVs operating throughout a given region. However, it is also contemplated that the performance data can be gathered and analyzed on board the SDV, which can store the set(s) of quantitative metrics for analyzing the performance data.

Among other benefits, the examples described herein achieve a technical effect of providing a standardized performance and safety measurement and performance optimization system for autonomous or self-driving vehicles. Performance data from vehicles can be analyzed against ideal human driving standards to ultimately ensure a standard of safety and passenger comfort for public road operation.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV may be used herein interchangeably, and can refer to any vehicle which is operated in a state of automation with respect to steering, propulsion, and braking. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

System Descriptions

FIG. 1A is a block diagram illustrating an example vehicle performance measurement system, as described herein. The vehicle performance measurement system 100 can be implemented with human-driven vehicles as well as autonomous vehicles (AVs) or self-driving vehicles (SDVs). For example, in an initial phase, the performance measurement system 100 can be implemented on any number of human driven vehicles to measure various driver performance parameters. Over the course of hundreds, thousands, or millions of miles driven, a backend performance optimization system 160 can utilize the performance data 142 of human drivers from the measurement system 100 to establish a set of metrics upon which to subsequently gauge SDV performance. Such metrics can comprise subjective or objective values or ranges with which SDV performance may be compared, and can include safety metrics, performance metrics, and comfort metrics.

Furthermore, each established metric may be classified under a single grouping (e.g., performance, safety, comfort, or traffic law compliance), or may overlap with other groupings. Still further, in establishing the metrics, the performance optimization system 160 can apply weightings or rankings to each metric in order to prioritize SDV operation with respect to more important metrics (e.g., certain safety and compliance metrics) over less important metrics (e.g., certain comfort metrics). Thus, in analyzing performance data 144 for an SDV for any given driving session, or over the course of multiple driving sessions, the performance optimization system 160 can not only determine the SDV's performance in view of the various established metrics, but can further generate a set of SDV operation configurations (i.e., a configuration package 162) that the SDV's control system 155 can utilize to bolster its overall performance.

According to examples provided herein, the vehicle performance measurement system 100 can include one or more cameras 120, such as monocular and/or stereoscopic cameras, and one or more LIDAR sensor systems 125. The camera(s) 120 and LIDAR sensors 125 can provide observational data 127 corresponding to a sensor view of the vehicle, whether the vehicle is human or autonomously driven. In certain aspects, the measurement system 100 can further include an inertial measurement unit (IMU) 110 comprised of one or more gyroscopic sensors, accelerometers, and/or magnetometers for providing precise measurements of the vehicle's specific force (e.g., the lateral g-forces based on the vehicle's acceleration, braking, steering, and road features), angular rate, and/or magnetic field surrounding the measurement system 100. According to certain examples, the measurement system 100 can further include a GPS unit 105 to provide location data 107 indicating the vehicle's position with respective to the given region in which the vehicle operates.

In some examples, the observational data 127 from the LIDAR(s) 125 and the camera(s) 120, the location data 107 from the GPS unit 105, and the IMU data 112 from the IMU 110 can be managed by a data manager 150, which can collectively store the data as performance data (i.e., human performance data 142 and SDV performance data 144) in a local database 140. In examples described herein, the data manager 150 can correspond to or be implemented by one or more controllers or processors of the measurement system 100. In some examples, the data manager 150 can correlate the location data 107, the observational data 127, and the IMU data 112 with time and/or location stamps for subsequent data analysis. For human driven vehicles, the collective human performance data 142 can be analyzed by a performance optimization system 160 to establish a set of human performance metrics 161 with which SDV performance data 144 from SDVs can be compared and scrutinized.

In accordance with examples described herein, the measurement system 100 can be coupled to or mounted to any number of human-driven vehicles (e.g., one the order of hundreds or thousands of vehicles) in an initial data-collection phase. For example, one or more manufacturers of human driven vehicles with interests in autonomous driving technology can manufacture certain vehicles to include the measurement system 100 to gather performance data 142 for human drivers. The measurement system 100 can include a system interface 130 to transmit the human performance data 142 to the performance optimization system 160. As provided herein, the human performance data 142 can comprise any combination of location data 107, observational data 127 and IMU data 112 that provide specific forces and data correlations corresponding to any driving session for a driver in virtually any conditions and scenarios. This initial phase of performance data 142 collection can encompass any time frame, or can be persistent, until the performance optimization system 160 has built a robust set of human performance metrics 161 with which SDV performance data 144 can be compared.

In setting the human performance metrics 161, the performance optimization system 160 can be selective to establish sensible safety and comfort ranges that SDVs must meet (e.g., in multiple different conditions and environments over a certain amount of mileage) in order to be considered road-worthy on public roads. Thus, the human performance metrics 161 can be selected to be as stringent as necessary for certain metrics (e.g., a red traffic light compliance metric) and somewhat flexible for other metrics (e.g., certain comfort metrics). Further description of the performance optimization system 160 and metric classification and weighting is provided below with respect to FIG. 3.

As provided herein, the system interface 130 can connect with the performance optimization system 160 via a wired bus or plug-in device. Accordingly, the human performance data 142 and/or the SDV performance data 144 can be transmitted to the performance optimization system 160 via the wired bus or plug-in device. In variations, the system interface 130 can comprise a wireless communication module (e.g., implementing Wi-Fi, BLUETOOTH, WiGig, WiMAX, etc.), and can transmit the human performance data 142 and/or SDV performance data 144 over one or more networks 157.

In a subsequent phase, the measurement system 100 can be included as a component of individual SDVs to store SDV performance data 144, also comprising any combination of observational data 127, location data 107, and IMU data 112. As provided herein, one or more of the GPS unit 105, the camera(s) 120, the LIDAR(s) 125, and the IMU 110 can be included in a single, bolt-on component comprising the vehicle performance measurement system 100, or can be included as integrated components of the SDV (e.g., as part of a sensor array of an SDV). According to some examples, the measurement system 100 can further include a vehicle interface 115 to couple the measurement system 100 to the SDV control system 155 in order to receive control system data 117 indicating the various control system parameters utilized by the SDV control system 155 in operating the acceleration, steering, and braking systems of the SDV.

In certain implementations, the data manager 150 can correlate the control system data 117 with the location data, 107, the observational data 127, and/or the IMU data 112, and collectively store the foregoing data as the SDV performance data 144 in the local database 140. As described herein, the SDV performance data 144 can be compiled over the course of a single or multiple autonomous driving sessions. For example, prior to allowing a specified SDV, or SDV type, to operate on public roads and highways, certain safety and/or comfort standards (e.g., a set of National Highway Traffic Safety Administration standards) may need to be met. For example, these safety standards can mandate that any particular SDV must perform within a set of "green ranges" of the human performance metrics 161, which can indicate that the SDV performs better than say, 95% of human drivers across each of the human performance metrics 161 in multiple types of conditions and over a certain amount of mileage. Such stringent standards may be necessary in order to advance SDVs beyond the testing phase and into full licensing and integration. Furthermore, in certain implementations, these safety standards can be utilized by the performance optimization system 160 to establish the human performance metrics 161. Thus, in such examples, the human performance metrics 161 can be directly correlated to the safety standards that the SDV must meet in order to be fully operable and utilized in public settings.

In various implementations, the SDV performance data 144 can be transmitted to the performance optimization system 160 for scrutiny. As described herein, the performance optimization system 160 can determine a set of scores for the SDV based on the SDV performance data 144 for each of the human performance metrics 161. Such scores can indicate rankings or percentiles of the SDV in comparison with human drivers for each metric 161. For example, utilizing the IMU data 112, the performance optimization system 160 can determine that the SDV performs better than 97% of human drivers in ride comfort metrics. As another example, utilizing the combined SDV performance data 144, the performance optimization system 160 can determine that the SDV performs within the 90th percentile of human drivers across all traffic law compliance metrics (e.g., traffic light, stop sign, speed limit, yielding, and lane changing compliance metrics).

Some examples provide that the control system data 117 is also provided to the performance optimization system 160, and can be time and location correlated with the other SDV performance data 144. Thus, in analyzing the performance of the SDV, the analysis engine 160 can identify any potential underlying causes of certain weaknesses in SDV performance by also analyzing the SDV control system data 117. For example, the SDV may only score within the 65th percentile for ride comfort metrics associated with braking. To determine a cause for such poor performance, the performance optimization system 160 can analyze braking events in the SDV performance data 144 (e.g., utilizing the combination of the location data 107, IMU data 112, and the observational data 127).

According to examples described, the observational data 127 can indicate what exactly the SDV is reacting to when instigating brake inputs. The location data 107 can indicate where such brake inputs are being performed (e.g., whether on a highway, in city traffic, or on narrow roads). The IMU data 112 can indicate a g-force signature for each of the braking events. Finally, analysis of the control system data 117 in light of the foregoing data can indicate a potential cause for the underperformance in ride comfort. For example, the performance optimization system 160 can identify an overall deficiency in braking latency, which can result in irregular or spasmodic braking. While this may result in adequate safety compliance, the ride comfort may be undesirable for riders. Thus, the performance optimization system 160 can attempt to correct the braking latency deficiency without sacrificing, or with minimal sacrifice to the SDV's performance in the safety metrics.

The above analysis in determining a cause for poor or deficient performance under one or more human performance metrics 161 can be performed by the performance optimization system 160 for each metric outside a green range (e.g., where the SDV performs below a certain threshold standard, such as those necessary for licensure). In attempting to resolve such causes, the analysis engine 160 can analyze the control system data 117 from the SDV control system 155—which specifies the control commands implemented by the SDV on the acceleration, braking, steering, and auxiliary systems—in relation to the other data 107, 127, 112 in the SDV performance data 144. Accordingly to certain implementations, the performance optimization system 160 may then generate a configuration package 162 that can include a number of alterations to the manner in which the SDV control system 155 operates in order to attempt to resolve the deficiencies.

The performance optimization system 160 can transmit the configuration package 162 to the SDV control system 155, which can process the configuration package 162 to adjust a number of control system parameters in order to resolve the deficiencies. For example, the configuration package 162 can cause the SDV control system 155 to adjust or soften braking inputs in order to resolve the braking deficiency. As another example, the configuration package 162 can cause the SDV control system 155 to increase a following distance to forward vehicles to provide increased reaction time and enabling the braking inputs to be tempered without sacrificing safety.

In executing the configuration package 162, the vehicle performance and measurement system 100 can go through an additional iteration of data gathering. Thus, in some examples, previous SDV performance data 144 prior to execution of the configuration package 162 may be flushed or otherwise logged, and new SDV performance data 144 for the current iteration can be compiled. After satisfying operation conditions and mileage with the new configuration, this new SDV performance data 144 can be submitted to the performance optimization system 160 for a new round of scrutiny with respect to the established set of human performance metrics 161. If necessary, additional iterations may be completed until the SDV has succeeded in exceeding the established safety and comfort standards for public operation.

Furthermore, it is contemplated that the performance optimization system 160 may be included as on-board hardware, a logical component, or a combination of hardware and logic on the SDV itself. In such implementations, the SDV may be loaded with predetermined human performance metrics 161, and the SDV can periodically or continuously analyze the SDV performance data 144 from the vehicle performance measurement system 100 in order to ensure that the SDV operates within greenlit or standardized tolerance ranges for each of the performance metrics 161 (e.g., via implementation of machine learning techniques). Thus, it is contemplated that any detected deficiency with respect to any of the standardized performance metrics 161 can be resolved by executing a corrective configuration package 162 generated by the SDV itself.

Figures 1B, 1C:
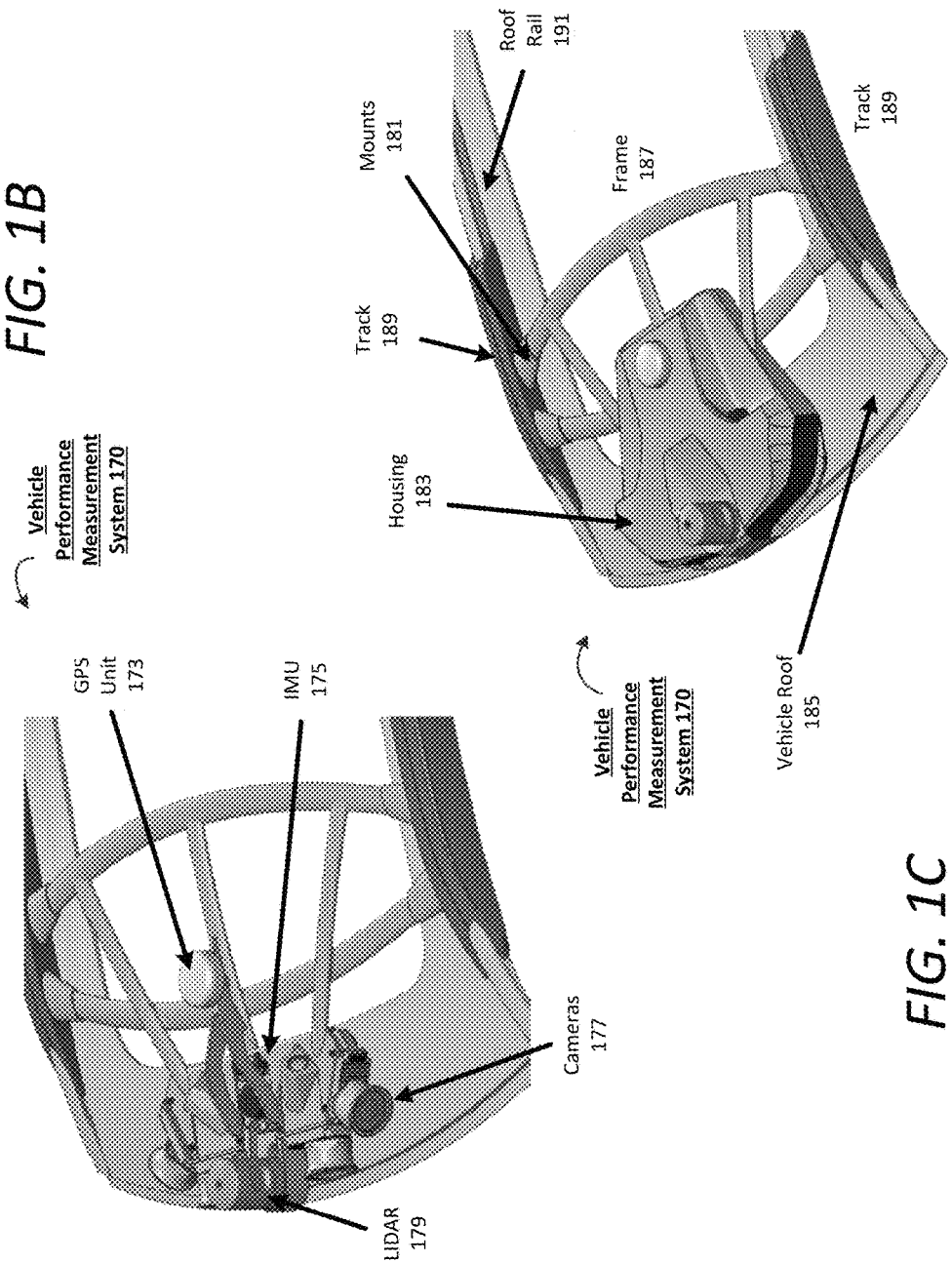
FIGS. 1B and 1C illustrate an example vehicle performance measurement system implemented on a vehicle, according to examples described herein.

FIGS. 1B and 1C illustrate an example vehicle performance measurement system implemented on a vehicle, according to examples described herein. For example, the vehicle performance measurement system 100 shown and described with respect to FIG. 1A can be implemented as the vehicle performance measurement system 170 as shown and described with respect to FIGS. 1A and 1B. Referring to FIG. 1B, in one example, the measurement system 170 can include a GPS unit 173, an IMU 175, a LIDAR 179, and a number of monocular and/or stereoscopic cameras 177. Each of the components can be coupled to a number of controllers and memory resources to store the collective data generated by each component. Furthermore, in some examples, the cameras 177 and LIDAR 179 can be arranged to focus on a forward operating direction of the vehicle.

In certain aspects, each of the components can be time synchronized (e.g., synched to the GPS receiver 173) in order to associate the collective data with time stamps so that subsequent analysis can yield correlations between each component. For example, a hard braking event detected by the IMU 175 can be correlated with a stray dog running across the road as identified by the LIDAR 179 and/or camera(s) 177. Subsequent scrutiny of the data can draw conclusions regarding the reaction to such an anomaly, such as whether the SDV braked too hard, not hard enough, too early, too late, and the like. However, since such an event can be considered anomalous, analysis of the data can further conclude that the braking event does not contribute to any fundamental operative issue with the SDV (e.g., a propensity towards over-reactive braking).

Referring to FIG. 1C, the vehicle performance measurement system 170 can include a housing 183 to house the various sensors and components. Furthermore, in some aspects, the measurement system 170 can include mounts 181, such as roof rack mounts to enable easy installation of the measurement system 170 onto a vehicle roof 185 of any vehicle having roof racks. In variations, the mounts 181 can comprise a mounting assembly that enables installation of the performance measurement system 170 onto roof rails 191 on the roof 185 of the vehicle. As such, the mounting assembly can include a frame 187 that supports the vehicle performance measurement pod 170. The frame 187 can be coupled on both the right and left side to a track 189, that is then mounted to the roof rail 191 on both sides of the vehicle roof 185. Thus, the mounting assembly can comprise a left track 189 and a right track 189 onto which the frame 187 is mounted, and which secures the measurement system 170 to the roof rails 191 of the vehicle.

In certain examples, the housing 183 securely covers the cameras 177, the IMU 175, and various other components (e.g., processors and memory), while leaving the LIDAR 179 exposed to transmit and receive laser light, as shown in FIG. 1B.

While the examples of FIGS. 1B and 1C show a discrete sensor pod mountable to a vehicle, further implementations can be integrated into the vehicle body work, or designed as part of the vehicle. Furthermore, components of the measurement system 170 can be dispersed throughout the vehicle. For example, the LIDAR 179 and cameras 177 can be included on the roof of the vehicle, whereas the IMU 175 can be included under the hood. Still further, for SDV implementations, one or more of the sensors can be included in an overall sensor array of the SDV itself (e.g., the sensor array that the SDV control system obtains sensor data from for purposes of perceiving the environment around the SDV, controlling the SDV, etc.).

Figure 2:
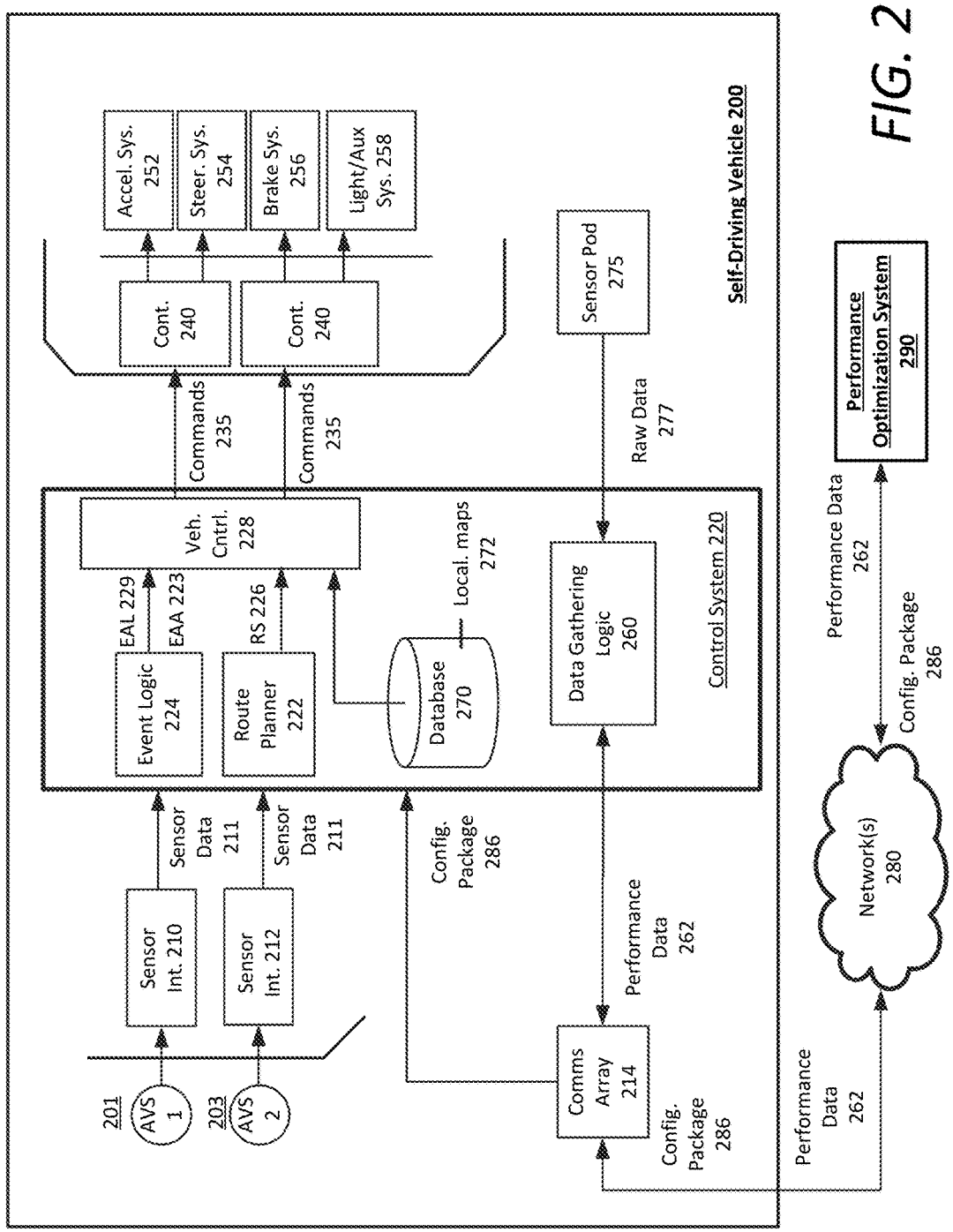
FIG. 2 is a block diagram illustrating an example autonomous vehicle or self-driving vehicle implementing a control system, as described herein.

FIG. 2 is a block diagram illustrating an example AV or SDV implementing a control system, as described herein. In an example of FIG. 2, a control system 220 can autonomously operate the SDV 200 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously, manually, or a combination of both.

According to some examples, the control system 220 can utilize specific sensor resources in order to intelligently operate the vehicle 200. For example, the control system 220 can operate the vehicle 200 by autonomously operating the steering 254, acceleration 252, and braking systems 256 of the vehicle 200 as the vehicle progresses to a destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes a computer or processing system which operates to process sensor data 211 that is obtained on the vehicle 200 with respect to a road segment upon which the vehicle 200 operates. The sensor data 211 can be used to determine actions which are to be performed by the vehicle 200 in order for the vehicle 200 to continue on a route to a destination. In some variations, the control system 220 can include other functionality, such as wireless communication capabilities, to send and/or receive wireless communications with one or more remote sources. In controlling the vehicle 200, the control system 220 can issue instructions and data, shown as commands 235, which programmatically control various electromechanical interfaces of the vehicle 200. The commands 235 can serve to control operational aspects of the vehicle 200, including propulsion, braking, steering, and auxiliary behavior (e.g., turning lights on).

The SDV 200 can be equipped with multiple types of sensors 201, 203 which can combine to provide a computerized perception of the space and the physical environment surrounding the vehicle 200. Likewise, the control system 220 can operate within the SDV 200 to receive sensor data 211 from the collection of sensors 201, 203, and to control various electromechanical interfaces for operating the vehicle 200 on roadways.

In more detail, the sensors 201, 203 operate to collectively obtain a complete sensor view of the vehicle 200, and further to obtain situational information proximate to the vehicle 200, including any potential hazards proximate to the vehicle 200. By way of example, the sensors 201, 203 can include multiple sets of cameras sensors 201 (video cameras, stereoscopic pairs of cameras or depth perception cameras, long range cameras), remote detection sensors 203 such as provided by radar or LIDAR, proximity or touch sensors, and/or sonar sensors (not shown).

Each of the sensors 201, 203 can communicate with the control system 220 utilizing a corresponding sensor interface 210, 212. Each of the sensor interfaces 210, 212 can include, for example, hardware and/or other logical components which are coupled or otherwise provided with the respective sensor. For example, the sensors 201, 203 can include a video camera and/or stereoscopic camera set which continually generates image data of the physical environment of the vehicle 200. As an addition or alternative, the sensor interfaces 210, 212 can include a dedicated processing resource, such as provided with a field programmable gate array ("FPGA") which can, for example, receive and/or process raw image data from the camera sensor.

According to one implementation, the SDV can include a set of controllers 240 to implement commands 235 from the control system 220 on the various systems of the SDV 200. For example, the controllers 240 can implement the commands 235 on the acceleration 252, steering 254, braking 256, and auxiliary systems 258 of the SDV 200 to control propulsion, steering, braking, and/or other vehicle behavior to operate the SDV 200 along a current route. Thus, while the vehicle 200 actively drives along the current route, the controller(s) 240 can continuously adjust and alter the movement of the vehicle 200 in response to receiving a corresponding set of commands 235 from the control system 220.

According to examples, the commands 235 can specify actions to be performed by the vehicle 200. The actions can correlate to one or multiple vehicle control mechanisms (e.g., steering mechanism 254, brakes 256, accelerator 252, etc.). The commands 235 can specify the actions, along with attributes such as magnitude, duration, directionality, or other operational characteristics of the vehicle 200. By way of example, the commands 235 generated from the control system 220 can specify a relative location of a road segment which the SDV 200 is to occupy while in motion (e.g., changing lanes, moving into a center divider or towards shoulder, turning the vehicle, etc.). As other examples, the commands 235 can specify a speed, a change in acceleration (or deceleration) from braking or accelerating, a turning action, or a state change of exterior lighting or other components. The controllers 240 can translate the commands 235 into control signals for implementation on the SDV's 200 operative systems 252, 254, 256, 258.

In an example of FIG. 2, the control system 220 can include a route planner 222, event logic 224, and vehicle control logic 228. The vehicle control logic 228 can convert alerts of event logic 224 ("event alert 229") into commands 235 that specify a set of vehicle actions. Furthermore, in operating the acceleration 252, braking 256, and steering systems 254 of the SDV 200, the control system 220 can include a database 270 that stores previously recorded and processed localization maps 272 of the given region. As described herein, the localization maps 272 can comprise processed or normalized surface data that enables the control system 220 to compare with the sensor data 211 in order to identify any potential hazards while operating throughout the given region.

Additionally, the route planner 222 can select one or more route segments 226 that collectively form a path of travel for the SDV 200 when the vehicle 200 is on a current trip (e.g., servicing a pick-up request). In one implementation, the route planner 222 can specify route segments 226 of a planned vehicle path which defines turn by turn directions for the vehicle 200 at any given time during the trip. The route planner 222 may utilize the sensor interface 212 to receive GPS information as sensor data 211. The vehicle control logic 228 can process route updates from the route planner 222 as commands 235 to progress along a path or route using default driving rules and actions (e.g., moderate steering and speed).

In some examples, the route planner 222 can receive route information or instructions over a network 280 from a transport management system, which can instruct the SDV 200 to make pick-ups and drop-offs of passengers in connection with a transportation arrangement service, such as those provided by UBER, Inc. of San Francisco, Calif.

In certain implementations, the event logic 224 can trigger low level responses to detected events. A detected event can correspond to a roadway condition or obstacle which, when detected, poses a potential hazard or threat of collision to the vehicle 200. By way of example, a detected event can include an object in the road segment, heavy traffic ahead, and/or wetness or other environmental conditions on the road segment. The event logic 224 can use sensor data 211 from cameras, LIDAR, radar, sonar, or various other image or sensor component sets in order to detect the presence of such events as described. For example, the event logic 224 can detect potholes, debris, objects projected to be on a collision trajectory, and the like. Thus, the event logic 224 can detect events which enable the control system 220 to make evasive actions or plan for any potential hazards.

When events are detected, the event logic 224 can signal an event alert 229 that can classify the event and indicate the type of avoidance action to be performed. Additionally, the control system 220 can determine whether an event corresponds to a potential incident with a human driven vehicle, a pedestrian, or other human entity external to the SDV 200. In turn, the vehicle control 228 can determine a low level response based on a score or classification of the event. Such response can correspond to an event avoidance action 223, or an action that the SDV 200 can perform to maneuver based on the detected event and its score or classification. By way of example, the vehicle response can include a slight or sharp vehicle maneuver for avoidance using a steering control mechanism and/or braking component. The event avoidance action 223 can be signaled through the commands 235 for controllers 240 to execute on the SDV's 200 acceleration system 252, steering system 254, and braking system 256.

When an anticipated dynamic object of a particular class does in fact move into position of likely collision or interference, some examples provide that event logic 224 can signal the event alert 229 to cause the vehicle control 228 to generate commands 235 that correspond to an event avoidance action 223. For example, in the event of an incident in the path of the vehicle 200, the event logic 224 can signal the event alert 229 to avoid a collision. The event alert 229 can indicate (i) a classification of the event (e.g., "serious" and/or "immediate"), (ii) information about the event, such as the type of object that generated the event alert 229, and/or information indicating a type of action the vehicle 200 should take (e.g., location of object relative to path of vehicle, size or type of object, etc.).

According to examples described herein, the SDV 200 can include a communications array 214 to communicate over one or more networks 280 with an performance optimization system 290, such as the performance optimization system 160 described with respect to FIG. 1A. The control system 220 of the SDV 200 can include data gathering logic 260 to compile raw data in accordance with the vehicle performance measurement system 100 as shown and described with respect to FIG. 1A. For example, the SDV 200 can include a sensor pod 275 comprising the various components and sensors shown in FIGS. 1B and 1C. The sensor pod 275 can provide raw data 277 comprising IMU data, observational data from the LIDAR and/or cameras, and/or GPS data from a GPS receiver. As provided herein, the data gathering logic 260 can also receive the sensor data 211 from the SDV's 200 on-board sensors 201, 203 for storage as performance data 262.

Thus, the data gathering logic 260 can compile the performance data 262 from the various sensors and components of the SDV's 200 sensors and/or the sensor pod 275—which can comprise one or more LIDARs, cameras, an IMU, and a GPS receiver. As discussed herein the performance data 262 can be stored locally in a database (e.g., database 270), and/or can be transmitted to the performance optimization system 290 over the one or more networks 280. As further discussed herein, the performance optimization system 290 can process the performance data 262 based on a set of human performance metrics to determine the overall performance of the SDV 200. Thus, the performance optimization system 290 may determine a score or percentile for the SDV 200 for each metric to determine how well the SDV 200 is performing in relation to an average or idealized human driver.

In certain implementations, the performance optimization system 290 can utilize the performance data 262 to generate a configuration package 286 comprising a set of parameters that the control system 220 can process to alter the manner in which the control system 220 interprets and reacts to sensor data 211 from the SDV's 200 camera, LIDAR, sonar, and other sensor systems. For example, the configuration package 286 can be processed by the vehicle control 228 to adjust one or more parameters in which the vehicle control 228 generates the commands 235, which can comprise of acceleration, braking, and steering commands. In various aspects, such adjustments can seek to improve the SDV's 200 performance with respect to certain metrics.

Figure 3:
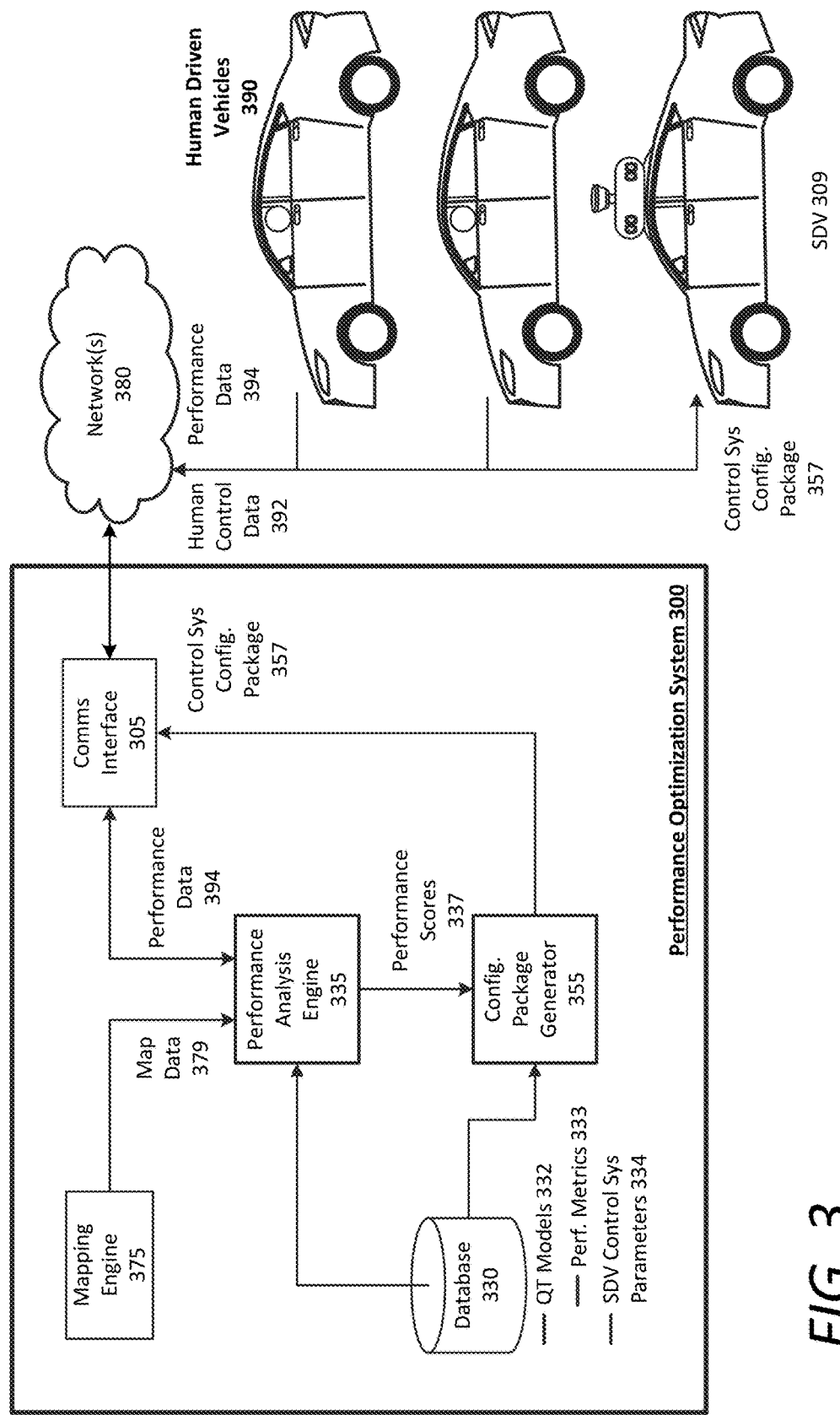
FIG. 3 is a block diagram illustrating an example performance optimization system in communication with a fleet of vehicles, as described herein.

FIG. 3 is a block diagram illustrating an example performance optimization system in communication with a fleet of vehicles, as described herein. In the examples shown with respect to FIG. 3, a set of human driven vehicles 390 can be provided with a vehicle performance measurement device, such as those shown and described with respect to FIGS. 1A through 1C. As further described herein, the performance optimization system 300 can collect human control data 392 from human driven vehicles 390 in order to determine a set of human performance metrics 333 with which to compare performance data 394 from an SDV 309 or fleet of SDVs. Such metrics 333 can include acceleration and braking metrics (e.g., braking latency and intensity), lane positioning, consistency in maintaining distances from other vehicles and pedestrians, compliance with stop signs, stop lights, and other traffic signs and regulations, speed control, steering smoothness and consistency, and the like.

Further human performance metrics 333 can include overall braking comfort, specific types of braking performance (e.g., reactive braking versus anticipated braking), fuel consumption and performance efficiency, lateral g-forces, overall acceleration performance, ride smoothness, condition-based performance (e.g., any particular metric in snowy or rainy conditions), speed control, overall cautiousness, slowing or stopping inappropriately, lane changing behavior, steering jitter, traffic law compliance, traffic light compliance, stopping positioning, proximity to objects, vehicles, or people, yield behavior, subjective ratings from riders, following behavior (e.g., tailgating), braking latency, acceleration latency, steering latency (i.e., response time), use of headlights and turn signals, braking distances, and the like. Utilizing the human control data 392, the performance optimization system 300 can build a set of quantitative models 332 to run subsequently acquired performance data 394 through in order to gauge the performance of an SDV 309 in relation to an idealized human driver. Such quantitative models 332 can be stored in a database 330 of the performance optimization system 300.

For example, running performance data 394 from an SDV 309 through the quantitative models 332 can yield a performance result or score 337 for the SDV 309 for each metric 333. In certain implementations, the performance optimization system 300 can build the quantitative models 332 using the human control data 392 from the measurement systems on human driven vehicles. The human control data 392 can be processed by the performance optimization system 300 to set ranges for each metric. For example, a data set from a particular human driven vehicle can be processed by the performance optimization system 300 to determine the driver's performance in relation to all other drivers for each particular metric. The driver's rating can comprises a series of scores or percentiles indicating that the driver is say, in the 45th percentile in overall traffic law compliance, or the 75th percentile in overall ride comfort. A trialing process or initial phase can be implemented for data collection and to build a robust set of quantitative models 332 for the performance metrics 333 that provide consistent, accurate, and reliable performance scores for subsequent implementation for SDVs.

Once the quantitative models 332 are built, according to many examples, the performance optimization system 300 can include a communications interface 305 which can receive performance data 394 from SDVs 309 operating throughout a given region. In one example, the communications interface 305 connects with the SDVs 309 wirelessly over one or more networks 380. In variations, the communications interface 305 can include a data bus comprising an input port (e.g., a universal serial bus port) to receive the performance data 394 either via direct line or external memory resource.

The performance optimization system 300 can further include a performance analysis engine 335, which can process the performance data 394 received from a particular SDV 309 using the quantitative models 332. As described herein, the performance data 394 can include raw or pre-processed sensor data from the vehicle performance measurement system of the SDV 309. Thus, the performance data 394 can include IMU data (e.g., accelerometer and gyroscope data), observational data from the SDV's 309 LIDAR and/or camera sensor systems, and location data from a GPS receiver. In one example, the performance optimization system 300 can include a mapping engine 375 that provides map data 379 to the performance analysis engine 335 to enable the performance analysis engine 335 to correlate the performance data 394 with specified locations or areas within the given region in which the SDV 309 operates. For example, performance data 394 indicating high caution by the SDV 309 (e.g., unusually sensitive braking performance) can be correlated to a school zone in the map data 379, which the performance analysis engine 335 can take into consideration when executing the quantitative models 332 with the performance data 394.

As provided herein, the performance data 394 can comprise data from the SDV 309 operating on a pre-configured course in a variety of conditions, or on public roads after an initial certification process. It is contemplated that SDV performance may deteriorate over time, requiring replacement parts necessitating configuration and integration with the other SDV components. Thus, the performance optimization system 300 can provide a standardized certification for not only new SDVs, but also SDVs that require fine-tuning or recertification.

According to some aspects, in running the performance data 394 through the quantitative models 332, the performance analysis engine 335 can generate a set of performance scores 337 indicating the SDV's 309 performance with respect to the performance metrics 333. Such scores can indicate whether the SDV 309 has passed or failed for each of the metrics. In variations, the performance scores 337 can comprise a set of charts that indicate a passable range for each performance metric 333, and an indicator of the SDV's 309 performance on each chart with respect to each metric 333.

The performance scores 337 can be provided to a configuration package generator 355, which can analyze the SDV's 309 performance with respect to each metric 333. In some examples, the performance optimization system 300 can store SDV control system parameters 334 for each particular type of SDV. The SDV control system parameters 334 can indicate the configuration settings of the SDV 309 that map the SDV's 309 behavior. For example, the parameters 334 can include braking strength and reaction time in relation to the SDV's 309 decision-making process, or general acceleration settings.

According to some examples, the configuration package generator 355 can utilize the SDV control system parameters 334 in analyzing the performance scores 337 of the SDV 309. In some examples, the configuration package generator 355 can identify certain deficiencies in the SDV's 309 operation in the performance scores 337, and utilize the SDV control system parameters 334 to determine a set of corrective adjustments to the SDV's 309 control system parameters 334 that can strengthen the SDV's 309 performance with respect to certain metrics 333. As a general example, the performance scores 337 can indicate that the SDV 309 is deficient in overall ride comfort, further indicating general hard braking and aggressive steering. The configuration package generator 355 can utilize the SDV control system parameters 334 to generate a control system configuration package 357 that includes a number of adjustments to be implemented by the SDV's 309 control system in order to alleviate the ride comfort deficiency. Such adjustments can include, for example, increasing braking distances, and softening steering responses.

Accordingly, based on the performance scores 337, the configuration package generator 355 can generate a control system configuration package 357 executable by the SDV's 309 control system to ultimately improve the SDV's 309 performance with respect to the specific performance metrics 333. The performance optimization system 300 can then transmit the control system configuration package 357 to the SDV 309 for implementation. As provided herein, execution of the configuration package 357 by the SDV's 309 control system can alter the manner in which the control system responds to sensor data (e.g., LIDAR and camera data) in operating the SDV's 309 acceleration, braking, and steering systems. Such adjustments can also comprise general modifications to the SDV's 309 use of the acceleration, braking, and steering system to improve SDV compliance with traffic laws and regulation, SDV ride comfort, and various other performance metrics 333 with minimal sacrifice in SDV performance with respect to other metrics 333.

Methodology

Figure 4:
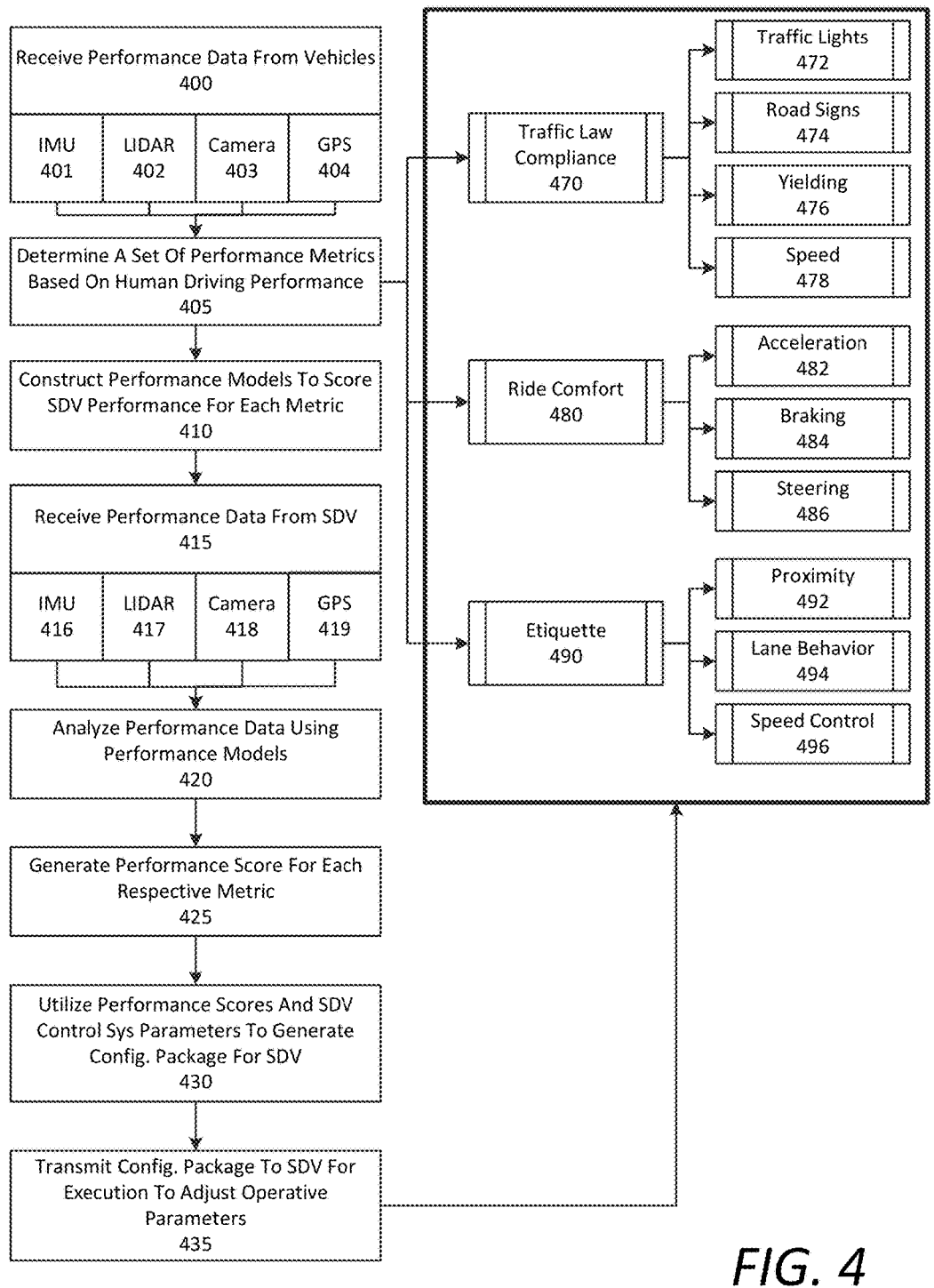
FIG. 4 is a flow chart describing an example method of analyzing performance data from an SDV and generating an SDV configuration package to improve SDV performance, according to examples described herein.

FIG. 4 is a flow chart describing an example method of analyzing performance data from an SDV and generating an SDV configuration package to improve SDV performance, according to examples described herein. In the below description of FIG. 4, reference may be made to reference characters representing like features as shown and described with respect to FIG. 1A through FIG. 3. Furthermore, the method described with respect to FIG. 4 may be performance by an example performance optimization system 160, 290, 300 as shown and described with respect to FIGS. 1A, 2, and 3. Referring to FIG. 4, the performance optimization system 300 can receive performance data from any number of human driven vehicles 390 (400). The performance data can comprise IMU data (401), LIDAR data (402), camera data (403), and/or GPS data (404), and can provide the performance optimization system 300 with human control information 392 indicating human driving performance and characteristics with which to compare SDV performance.

According to examples described herein, the performance optimization system 300 can determine a set of performance metrics 333 based on the human control information 392 (405). In some examples, the performance metrics 333 can be classified as three main classifications comprising traffic law compliance (470), ride comfort (480), and performance etiquette (490). It is contemplated that many other classifications can be included, and the performance metrics 333 can include any conceivable attribute or trait with which to compare SDV operative behavior with human behavior. Under the traffic law compliance umbrella, performance metrics 333 can generally include compliance with traffic lights (472), road signs (474), yielding behavior (476), and speed limit compliance (478). However, more granular metrics may also be included, such as compliance with rules relating to rights-of-way, lane use, turning, individual intersections, pedestrian crossings, overtaking, carpool lanes, pre-emption (e.g., moving over for an emergency vehicle), and the like.

Under the ride comfort umbrella, performance metrics 333 can include anything having to do with an SDV's acceleration (482), braking (484), and steering (486) that can affect the comfort of passengers, as described herein. A few examples can include acceleration intensity, steering jitter or aggression, braking latency, braking intensity, fuel or energy usage efficiency, and lateral g-force control. Under the etiquette umbrella, performance metrics 333 can include proximity control with pedestrians, objects, and other vehicles (492), lane behavior (494) (e.g., lane positioning and lane changing behavior), and speed control (496) (e.g., avoidance of erratic or abrupt braking and acceleration). As provided herein, several metrics can overlap with other metric classifications. Furthermore, adjustments to improve performance with respect to certain metrics can affect the SDV's performance with respect to other metrics. Thus, examples described herein seek to optimize the SDV's performance across all performance metrics, giving high priority to certain metrics (e.g., red light compliance), while taking into consideration factors such as passenger comfort and etiquette with external entities (e.g., other drivers and pedestrians).

In certain implementations, the performance optimization system 300 can construct performance models 332 for scoring SDV performance with respect to each performance metric 333 (410). As described herein, the performance models 332 can attribute a priority or weighting for each performance metric 333. The performance optimization system 300 can subsequently receive performance data 394 from a particular SDV 309 (415). In many examples, this performance data 394 can also comprise data from an IMU (416), a LIDAR (417), cameras (418), and/or a GPS receiver (419) of the SDV 309. The performance optimization system 300 may then analyze the performance data 394 using the constructed performance models 332 (420), and generate a performance score 337 for the SDV 309 for each respective performance metric 333 (425).

In some examples, the performance optimization system 300 can further receive a set of configurations that the SDV 309 is currently implementing during operation. Such configurations can include sensitivity settings for responding to dynamic objects in sensor data, braking distances, acceleration settings, traffic law compliance settings and priorities (e.g., right-of-way priorities), and the like. Utilizing the performance scores 337 and the control system settings or configurations of the SDV 309, the performance optimization system 300 can generate a configuration package 357 for the SDV 309 (430). The configuration package 357 can include a number of adjustments to the SDV's 309 control system settings that affect how the SDV 309 operates on public roads and in traffic conditions. The performance optimization system 300 may then transmit the configuration package 357 to the SDV 309 for execution to adjust a number of the SDV's 309 operative parameters (435). As described herein, implementation of the configuration package 357 can cause the SDV 309 to make a number of adjustments to its operation in order to bolster performance with regard to the performance metrics 333, including the traffic law compliance metrics (470), the ride comfort metrics (480), and the driving etiquette metrics (490).

Hardware Diagrams

Figure 5:
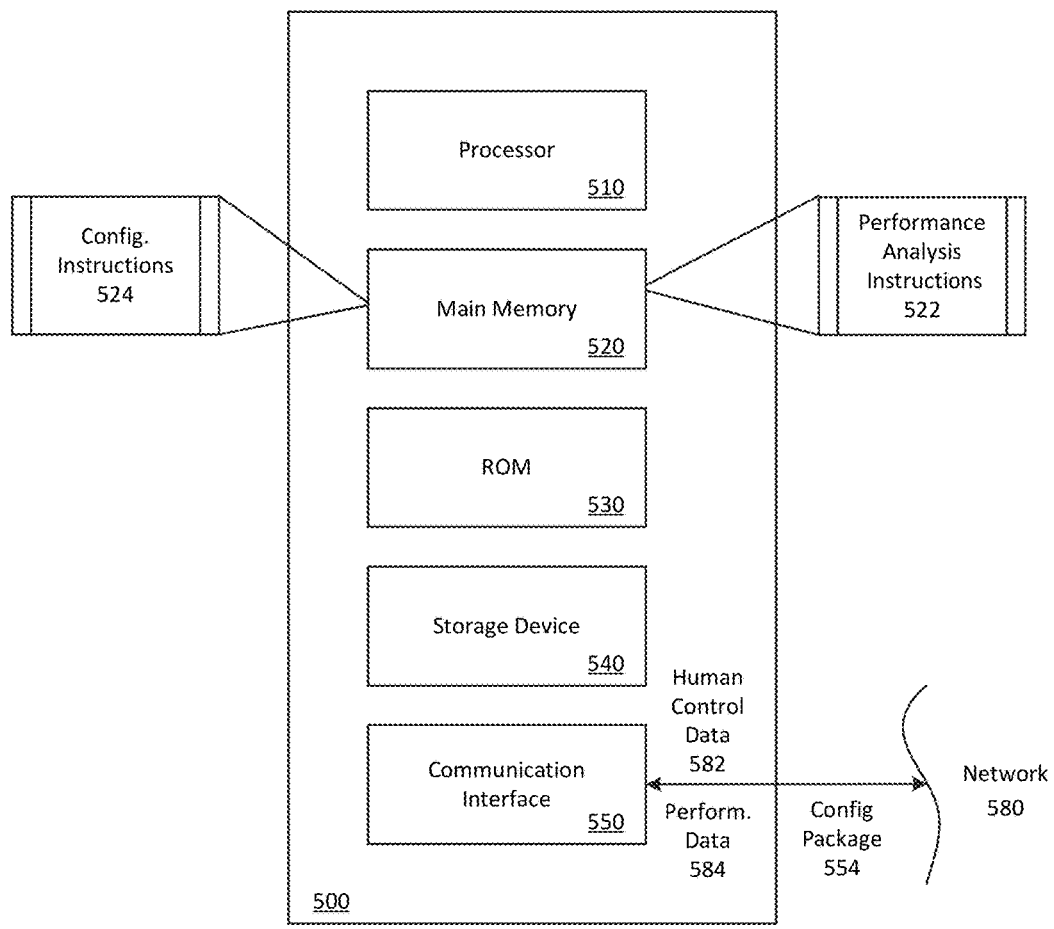
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIGS. 1A, 2, and 3, the performance optimization system 160, 290, 300 may be implemented using a computer system 500 such as described by FIG. 5. The performance optimization system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular network) through use of the network link (wireless or wired). Using the network link, the computer system 500 can communicate with one or more computing devices, one or more servers, driver devices, and/or a fleet of SDVs. In accordance with examples, the computer system 500 receives human control data 392 from measurement systems implemented on human-driven vehicles, and constructs performance models to gauge SDV performance based on a set of human-based metrics. The computer system 500 may then receive performance data 584 from an SDV. The executable instructions stored in the memory 520 can include performance analysis instructions 524, which the processor 510 can execute to analyze the performance of the SDV with respect to the set of performance metrics. The communication interface 550 can receive the performance data 584, and the processor 510—executing the performance analysis instructions 522—can generate a performance score for the SDV for each of the performance metrics.

The main memory 520 can also store configuration instructions 524, which the processor 510 executes to perform an optimization operation based on the performance scores in order to determine an optimal set of configuration settings for the SDV's control system. In performing the optimization, the processor 510 can utilize the performance scores and a set of current SDV configurations to generate a configuration package 554 that include a number of settings adjustments to maximize or otherwise optimize the SDV's performance with respect to the totality of the performance metrics.

The processor 510 is configured with software and/or other logic to perform one or more processes, steps and other functions described with implementations, such as described by FIGS. 1A through 4, and elsewhere in the present application.

Figure 6:
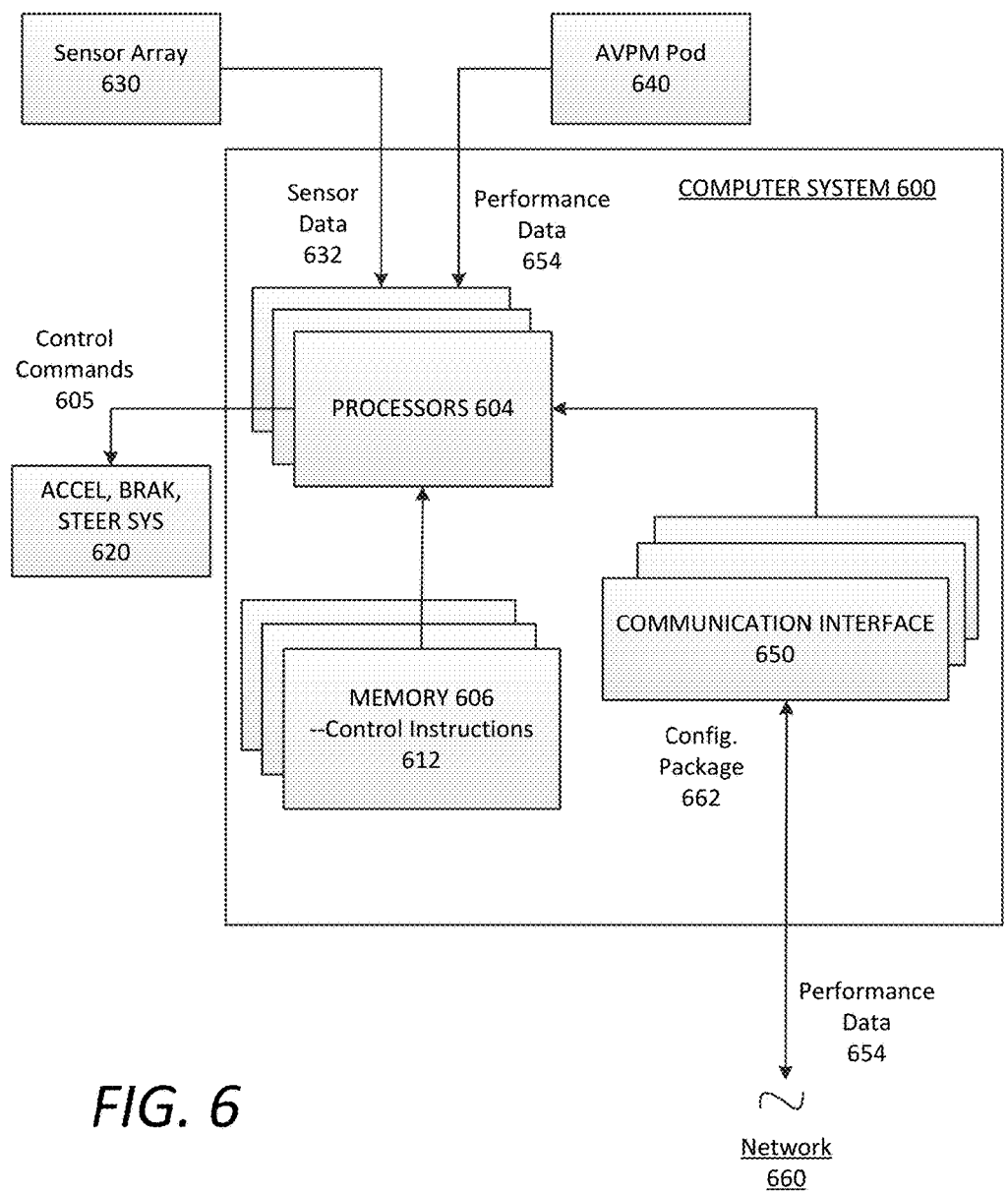
FIG. 6 is a block diagram illustrating a computing system for an SDV upon which examples described herein may be implemented.

FIG. 6 is a block diagram illustrating a computer system upon which example SDV processing systems described herein may be implemented. The computer system 600 can be implemented using one or more processors 604, and one or more memory resources 606. In the context of FIG. 2, the control system 220 can be implemented using one or more components of the computer system 600 shown in FIG. 6.

According to some examples, the computer system 600 may be implemented within an autonomous vehicle or self-driving vehicle with software and hardware resources such as described with examples of FIG. 2. In an example shown, the computer system 600 can be distributed spatially into various regions of the SDV, with various aspects integrated with other components of the SDV itself. For example, the processors 604 and/or memory resources 606 can be provided in the trunk of the SDV. The various processing resources 604 of the computer system 600 can also execute control instructions 612 using microprocessors or integrated circuits. In some examples, the control instructions 612 can be executed by the processing resources 604 or using field-programmable gate arrays (FPGAs).

In an example of FIG. 6, the computer system 600 can include a communication interface 650 that can enable communications over one or more networks 660 with a backend transport system, an performance optimization system, one or more other SDVs, and the like. In one implementation, the communication interface 650 can also provide a data bus or other local links to electro-mechanical interfaces of the vehicle, such as wireless or wired links to and from the SDV control system 220, and can provide a network link to a performance optimization system over one or more networks 660.

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a set of software instructions including, for example, control instructions 612. The control instructions 612 may be executed by one or more of the processors 604 in order to implement functionality such as described with respect to the SDVs herein. As described herein, the control instructions 612 are executed by the SDV to generate control commands 605 for operating the acceleration, braking, and steering systems 620. Thus, the processors 604 can receive live sensor data 632 from an on-board sensor array 630 (e.g., comprising LIDAR, camera, sonar, radar, and other sensor systems), and operate the acceleration, braking, and steering systems 620 along a current route based on the live sensor data 632.

In certain variations described herein, the SDV can include an autonomous vehicle performance measuring pod that includes a set of sensors for measure raw performance data 654 using an IMU, LIDAR, cameras, GPS, and the like. The computer system 600 can transmit the performance data 654 to a backend performance optimization system over the network 660, and receive a configuration package 662 comprising a number of adjustment settings. In one aspect, the configuration package 662 can alter the manner in which the processor 604 interprets the sensor data 632 in operating the acceleration, braking, and steering systems 620. For example, the configuration package 662 can comprise a set of alterations to the control instructions 612 to adjust the way the processors 604 comply with traffic regulations, control speed, implement the brakes and accelerator, etc. in order to bolster SDV performance and comfort.

While examples of FIGS. 5 and 6 provide for computing systems for implementing aspects described, some or all of the functionality described with respect to one computing system of FIGS. 5 and 6 may be performed by one or more other computing systems described with respect to FIGS. 5 and 6. Thus, once or more functions of the performance optimization system described herein may, for example, be performed by the computer system 600 implemented on the SDV.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An autonomous vehicle (AV) performance optimization system comprising:
one or more processors; and
one or more memory resources storing instructions that, when executed by the one or more processors, cause the one or more processors to:
receive AV performance data from an AV;
based on the AV performance data; determine one or more deficient performance metrics in which the AV does not meet one or more performance thresholds of a set of performance metrics;
generate a configuration package, executable by the AV, comprising a set of control system parameter adjustments for meeting or exceeding the one or more performance thresholds corresponding to the deficient performance metrics; and
transmit the configuration package to the AV for execution.

2. The AV performance optimization system of claim 1, wherein the executed instructions further cause the one or more processors to:
construct a set of performance models based on the set of performance metrics;
wherein the executed instructions cause the one or more processors to determine the one or more deficient performance metrics by running the AV data through the set of performance models.

3. The AV performance optimization system of claim 1, wherein the executed instructions cause the one or more processors to determine each of the one or more deficient performance metrics of the AV based on a determining a percentile indication, for each performance metric in the set of performance metrics, of the AV's performance in relation to human drivers.

4. The AV performance optimization system of claim 1, wherein the AV performance data comprise data from an inertial measurement unit, a LIDAR, and one or more cameras of the AV.

5. The AV performance optimization system of claim 1, wherein the AV performance data comprise location-based data from a global positioning system (GPS) receiver of the AV.

6. The AV performance optimization system of claim 1, wherein execution of the configuration package by the AV causes a control system of the AV to alter a manner in which the control system interprets sensor data from an on-board sensor array to generate control inputs for execution by acceleration, braking, and steering systems of the AV.

7. The AV performance optimization system of claim 1, wherein the executed instructions cause the one or more processors to classify individual performance metrics of the set of performance metrics as (i) traffic law compliance metrics, (ii) ride comfort metrics, or (iii) performance etiquette metrics.

8. The AV performance optimization system of claim 1, wherein the executed instructions further cause the one or more processors to:
in an initial phase, receive vehicle performance data from human-driven vehicles;
wherein the executed instructions cause the one or more processors to determine the set of performance metrics for determining AV performance in relation to human performance based on the vehicle performance data received in the initial phase.

9. A non-transitory computer-readable medium storing instructions that, when executed by one or more processors of an autonomous vehicle (AV) performance optimization system, cause the one or more processors to:
receive AV performance data from an AV;

based on the AV performance data, determine one or more deficient performance metrics in which the AV does not meet one or more performance thresholds of a set of performance metrics;

generate a configuration package, executable by the AV, comprising a set of control system parameter adjustments for meeting or exceeding the one or more performance thresholds corresponding to the deficient performance metrics; and transmit the configuration package to the AV for execution.

10. The non-transitory computer-readable medium of claim 9, wherein the executed instructions further cause the one or more processors to:

construct a set of performance models based on the set of performance metrics;

wherein the executed instructions cause the one or more processors to determine the one or more deficient performance metrics by running the AV data through the set of performance models.

11. The non-transitory computer-readable medium of claim 9, wherein the executed instructions cause the one or more processors to determine each of the one or more deficient performance metrics of the AV based on a determining a percentile indication, for each performance metric in the set of performance metrics, of the AV's performance in relation to human drivers.

12. The non-transitory computer-readable medium of claim 9, wherein the AV performance data comprise data from an inertial measurement unit, a LIDAR, and one or more cameras of the AV.

13. The non-transitory computer-readable medium of claim 9, wherein the AV performance data comprise location-based data from a global positioning system (UPS) receiver of the AV.

14. The non-transitory computer-readable medium of claim 9, wherein execution of the configuration package by the AV causes a control system of the AV to alter a manner in which the control system interprets sensor data from an on-board sensor array to generate control inputs for execution by acceleration, braking, and steering systems of the AV.

15. The non-transitory computer-readable medium of claim 9, wherein the executed instructions cause the one or more processors to classify individual performance metrics of the set of performance metrics as (i) traffic law compliance metrics, (ii) ride comfort metrics, or (iii) performance etiquette metrics.

16. The non-transitory computer-readable medium of claim 9, wherein the executed instructions further cause the one or more processors to:

in an initial phase, receive vehicle performance data from human-driven vehicles;

wherein the executed instructions cause the one or more processors to determine the set of performance metrics for determining AV performance in relation to human performance based on the vehicle performance data received in the initial phase.

17. A computer-implemented method of optimizing performance of an autonomous vehicle (AV), the method being performed by one or more processors and comprising:

receiving AV performance data from an AV;

based on the AV performance data, determining one or more deficient performance metrics in which the AV does not meet one or more performance thresholds of a set of performance metrics;

generating a configuration package, executable by the AV, comprising a set of control system parameter adjustments for meeting or exceeding the one or more performance thresholds corresponding to the deficient performance metrics; and transmitting the configuration package to the AV for execution.

18. The method of claim 17, further comprising:

constructing a set of performance models based on the set of performance metrics;

wherein determining the one or more deficient performance metrics comprises running the AV data through the set of performance models.

19. The method of claim 17, wherein determining each of the one or more deficient performance metrics of the AV comprises determining a percentile indication, for each performance metric in the set of performance metrics, of the AV's performance in relation to human drivers.

20. The method of claim 17, wherein the AV performance data comprise data from an inertial measurement unit, a LIDAR, and one or more cameras of the AV.

* * * * *